United States Patent [19]
McDonough et al.

[11] 3,837,786
[45] Sept. 24, 1974

[54] PHOTOFLASH ASSEMBLY WITH SERIALLY ADVANCING LAMPS AND EJECTOR

[75] Inventors: Thomas B. McDonough, Allenwood; John W. Shaffer, Williamsport, both of Pa.

[73] Assignee: GTE Sylvania Incorporated, Danvers, Mass.

[22] Filed: Nov. 21, 1973

[21] Appl. No.: 417,960

[52] U.S. Cl. .................................. 431/93, 240/1.3
[51] Int. Cl. .............................................. F21k 5/02
[58] Field of Search ..................................... 240/1.3; 431/92–95

[56] References Cited
FOREIGN PATENTS OR APPLICATIONS
1,111,507   7/1961   Germany ........................... 240/1.3
1,555,495   12/1968   France ................................ 240/1.3

*Primary Examiner*—Carroll B. Dority, Jr.
*Attorney, Agent, or Firm*—Edward J. Coleman

[57] ABSTRACT

A photoflash magazine comprising a plurality of flashlamps and associated reflectors movably supported within a closed container having a front face window located at a remote firing position in the container. Each lamp-reflector combination is mounted on a respective triangular-shaped pallet slidably retained in a channel. The plurality of pallets are alternately oriented along a two-track portion of the channel to minimize space requirements, and the pallets are urged toward the firing position by loading spring. A releasable latch engages the pallet located at the firing position and is operable for momentarily releasing the pallets to permt indexing thereof until the latch engages the next pallet. A cammed portion of the channel orients each pallet moving into the firing position so that the reflector and lamp on that pallet are operatively aligned with the front face window, and the firing position and window are offset from the camera lens sufficiently to reduce "red-eye" effect. When employing percussively ignitable flashlamps with associated striker springs on each pallet, a mechanical coupling is disposed between the firing position and an access aperture in the magazine for transmitting an impulse from a camera actuating member to individually release a striker spring to fire a lamp at the firing position. An opening is provided in the side of the magazine whereby the used lamp may be ejected subsequent to latch release, which may be actuated by a film advancing mechanism in the camera.

22 Claims, 16 Drawing Figures

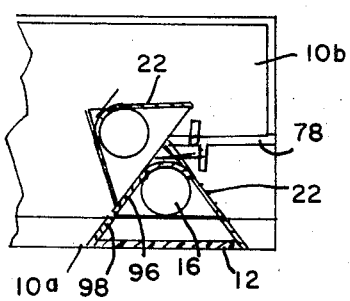
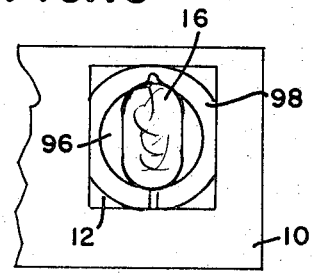
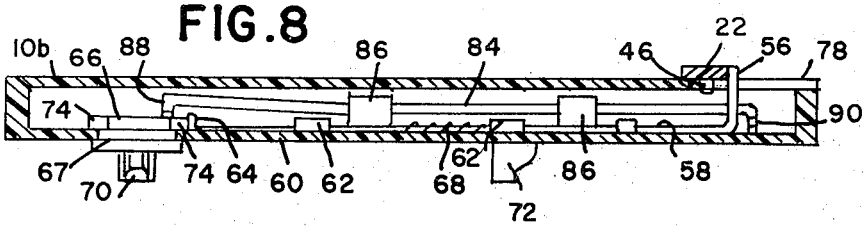
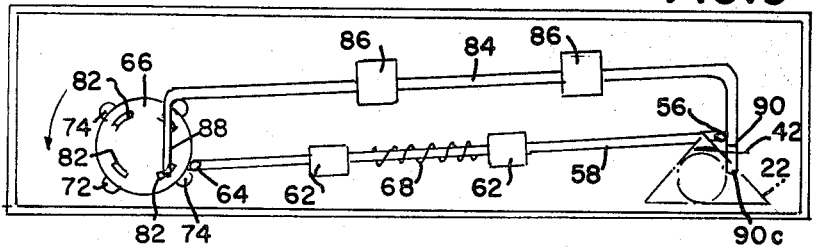
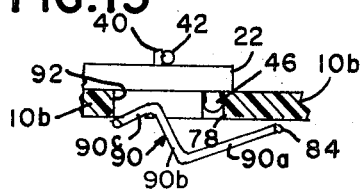
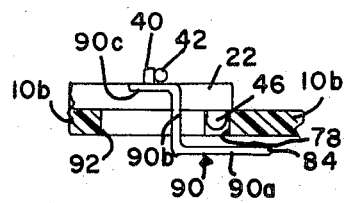
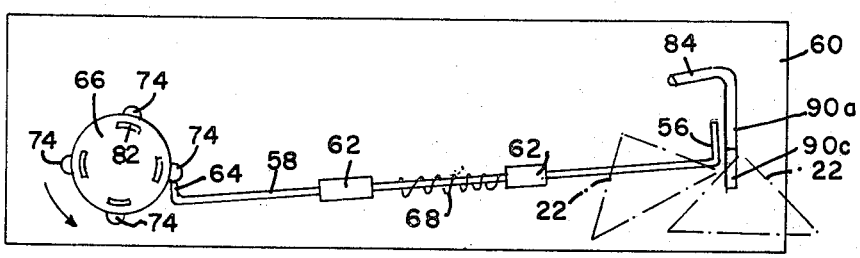

PHOTOFLASH ASSEMBLY WITH SERIALLY ADVANCING LAMPS AND EJECTOR

BACKGROUND OF THE INVENTION

This invention relates to multilamp photoflash assemblies and, more particularly, to a magazine containing a plurality of compactly stocked flashlamp units and means for automatically advancing fresh flashlamps to a remote firing position and ejecting used lamps.

The trend in photoflash devices has been toward the use of subminiature flashlamps (an envelope volume of less than 1 cubic centimeter) in compact, disposable, multilamp units to provide camera users with the advantages of greater convenience, compactness and portability. A currently popular flashlamp unit of this type is known generally in the trade as a flashcube, a specific embodiment of which is shown in U.S. Pat. No. 3,327,105, for example. The unit comprises a set of four flashlamps, each with its own reflector, mounted on a base and enclosed within a transparent cover, with each of the lamp-reflector assemblies facing a resepctive one of the four side walls of the cube. A spindle depends from the center of the flashcube base for operatively retaining the unit in a complementary receiving socket on a camera. In operation, the flashcube is sequentially rotated a quarter of a turn at a time, usually in response to each operation of the film advance mechanism of the camera, to successively place unused lamps in a firing position facing the object being photographed. Each of the flashlamps consists of an hermetically sealed, light transmitting glass envelope containing a filamentary combustible material, such as shredded zirconium foil, and a combustion supporting gas, such as oxygen. In the case of flashcubes employing electrically ignited lamps, a pair of lead-in wires pass through the lamp envelope to support therein a filament in combination with globules of ignition paste. When the flashcube is in the firing position, segments of the lead-in wires disposed outside the lamp envelope are securely engaged with electrical contacts in the camera socket, which in turn are connected by wires and a shutter-actuated switch to the camera power source, usually a pair of dry cell batteries. When a photographer actuates the shutter release mechanism to "snap" a picture, he also, by the same operation, closes the electrical circuit from the batteries to the ignition system in the lamp to thereby flash the lamp. The timing of the ignition of the combustible material in the lamp is synchronized with the exposure of the film by actuation of the shutter release so the efficient utilization of the light from the flashlamp may be obtained.

A not infrequent problem that has been faced by the average amateur photographer when using a battery operated flash system, however, has been failure of the lamp to fire due to weak batteries and/or dirt or corrosion on one or more of the electrical contacts in the system. To overcome this problem and provide improved reliability, percussive-type flashlamps have been developed which may be mechanically fired without the need for batteries. As described in U.S. Pat. No. 3,535,063, for example: such flashlamps have a mechanical primer sealed in one end of the lamp in lieu of lead-in wires. This primer may comprise a metal tube extending from the lamp envelope and a charge of fulminating material on a wire supported in the tube. Operation of the percussive flashlamp is initiated by an impact onto the tube to cause deflagration of the fulminating material up through the tube to ignite the combustible disposed in the lamp envelope. The percussive-type lamps are also connected in subminiature envelope sizes and are employed in percussive flashcube units having respective preenergized striker springs associated with each lamp, as described in U.S. Pat. No. 3,597,604. The percussive flashcube is indexed into firing position similarly to the electrical flashcube; however, the flashlamp to be used is fired by the action of a member, associated with the camera shutter mechanism, moving up through the flashcube base to release the respective preenergized striker spring, whereby it sharply impacts against the primer tube of the lamp.

Another development in the field of multilamp flash units for providing additional convenience and flexibility is the provision of a flashlamp magazine comprising a container within which a movable strip or rotatable endless belt carrying a plurality of flashlamps is disposed. For example, the belt may be carried by sprocket wheels mechanically connected to and driven by the film advancing mechanism of the camera. The container includes a single reflector-backed firing position to which the flashlamps are sequentially advanced for successive ignition. Such magazines are particularly advantageous in that they may be designed to carry a sufficient number of flashlamps for use with an entire roll of film without the need for changing the flashunit. For example, a 12 lamp magazine may be employed for successive flash operation with a 12 exposure roll of film. The following U.S. patents are examples of previously described electrically energized flash magazines of this type: U.S. Pat. No. 2,835,787; 3,176,482; 3,238,749; 3,263,068 and 3,452,660. Although providing a number of advantages, these prior art magazines are relatively bulky and cumbersome. In most cases, the used lamps are stored in the original packages, thus requiring additional space. Some units are complicated in design and construction by the use of camera driven sprocket wheels and endless belts and, thus, are somewhat unsuited to automated assembly. Further, none of these prior magazines provide for the use of percussive flashlamps.

In view of the current trend toward smaller size cameras, a much more compact flash magazine is desirable; however, miniaturized flash units may create photographic problems due to a substantial reduction in the lamp-to-lens distance. In the case of color film, the use of a flashlamp too near the lens when photographing human subjects may create an undesirable condition known as "red-eye," in which red light from the flashlamp is reflected by the retinas of the subject's eyes onto the photographic film to show the pupils as red on the developed color print. The only practical method of eliminating "red-eye" is to provide adequate separation between the camera lens and the flashlamp. One approach toward correcting this problem on small cameras employing flashcubes is described in U.S. Pat. No. 3,348,188, wherein a "flash extender" attachment is provided for supporting the flashcube at an increased distance away from the associated camera. The more remote flash location thereby provided is also advantageous for black and white photography in that it can be used to produce limited shadows for highlight and depth effect purposes without excess contrast. The flash extender also has some obvious disadvantages, however, in that it is a cumbersome piece of equipment (typically about 2½ inches long) relative to the compact camera and flashcube, and being an extra attachment, it is often forgotten by the amateur photographer.

SUMMARY OF THE INVENTION

Accordingly, it is an object of the present invention to provide an improved multiple phtoflash lamp assembly which is preenergized to serially advance the lamps during the operating sequence.

A particular object of the invention is to provide a compact percussive flashlamp magazine which is preenergized to sequentially advance the lamps to a firing position within a closed container.

Another object is to provide a compact flashlamp magazine preenergized to eject used lamps as fresh lamps are moved into firing position.

A further object is to provide a multilamp flash unit having improved means for reducing or eliminating the "red-eye" effect.

Briefly, these objects are attained in accordance with the invention, by a photoflash assembly comprising a plurality of pallets slidably retained in channel means on a base member, each pallet carrying a flashlamp and firing means. Spring loading means urges the pallets along the channel toward a firing position, and a releasable latching means engages the pallet at the firing position to thereby lock the position of the train of pallets. The latch is operable for momentarily releasing the spring-loaded pallets to permit indexing thereof until the latch engages the next pallet. More particularly, the movable pallets are housed in a closed container having a window at a remote firing position, which, when mounted on a camera, is offset from the lens thereof by a distance sufficient to reduce the effect of "red-eye." Preferably, the pallets are triangular-shaped and compactly stacked in an alternating manner, along a two track channel with a cammed portion for properly orienting each pallet that moves into the firing position. When employing percussively-ignitable flashlamps with associated striker springs on each pallet, a mechanical coupling is disposed between the firing position and an aperture in the magazine through which the coupling means is accessible to be mechanically actuated for releasing the striker associated with a lamp located at the firing position. An opening is provided in the side of the magazine whereby the used lamp may be ejected subsequent to latch release.

BRIEF DESCRIPTION OF THE DRAWINGS

This invention will be more fully described hereinafter in conjunction with the accompanying drawings, in which:

FIG. 8 is an elevational detail, partly in section, of the base of the magazine of FIG. 2 showing the mechanism mounted therein;

FIG. 9 is a plan view of the lower base portion of the flash magazine of FIGS. 1 and 2, with a pallet in the firing position being shown in phantom;

FIG. 10 is a simplified plan view of the base of FIG. 9 showing the latch mechanism in a released position, with two released pallets being shown in phantom;

FIG. 13 is a fragmentary detail view of the striker release mechanism of the magazine of FIG. 9 in a retracted position;

FIG. 14 is a detail view of the mechanism of FIG. 13 in a sensing position;

FIG. 15 is a simplified fragmentary plan view of an alternative embodiment of the magazine according to the invention; and FIG. 16 is a fragmentary front view of the magazine of FIG. 15.

DESCRIPTION OF PREFERRED EMBODIMENT

Figure 1:
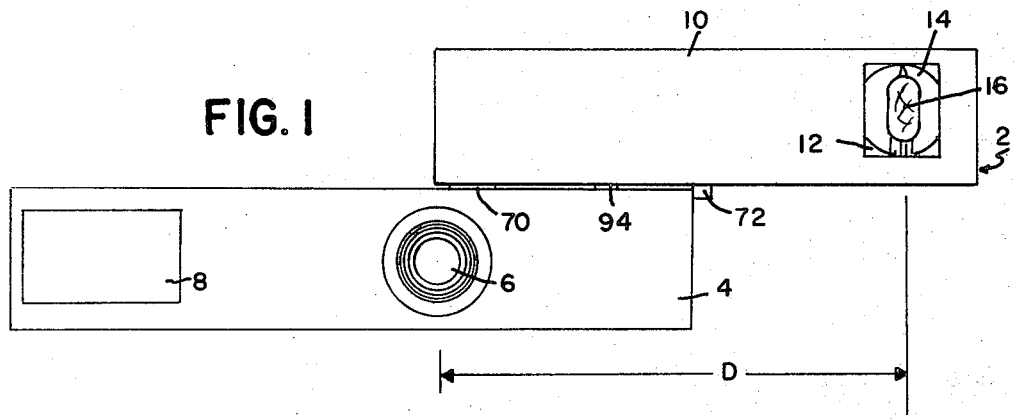
FIG. 1 is a front elevational view of a camera having a flash magazine according to the invention mounted thereon.

Referring to FIG. 1, a percussive flashlamp magazine 2 according to the invention is shown mounted on a camera 4 having a centrally disposed lens 6 and a viewfinder 8. The magazine 2 comprises a closed container 10 within which a plurality of percussive flashlamps are movably supported. The front face of the container 10 is provided with a window 12, of polystyrene or cellulose acetate for example, which defines a frame for a reflector 14 and flashlamp 16 located at a firing position in the magazine. As will be noted in FIG. 1, the window 12 and the firing position aligned therewith are preferably offset a predetermined distance from the camera lens 6 for eliminating or reducing the effect of "red-eye." A suitable compromise between compactness and the desired photographic effects may be achieved by locating the remote firing position and window 12 such that the horizontal distance D between the center of lens 6 and the center of a lamp 16 at the firing position is at least about 2½ inches.

Figure 3:
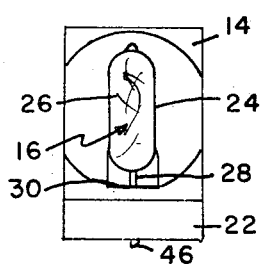
FIG. 3 is a front view of a single flashlamp-pallet unit of the magazine of FIG. 2.
Figure 4:
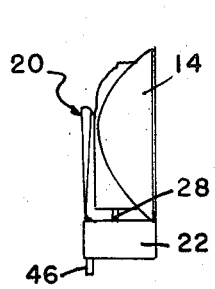
FIG. 4 is a side view of the unit of FIG. 3.
Figure 5:
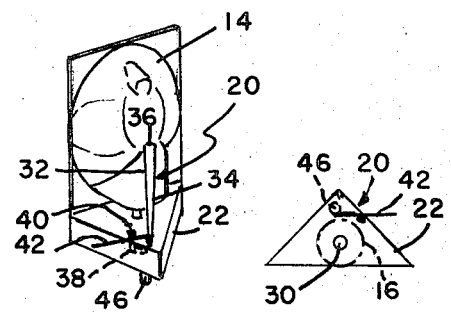
FIG. 5 is a rear perspective view of the unit of FIG. 3.
Figure 6:
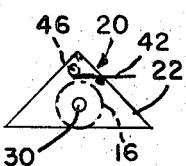
FIG. 6 is a top view of the unit of FIG. 3 with the reflector removed and the lamp shown in phantom.
Figure 2:
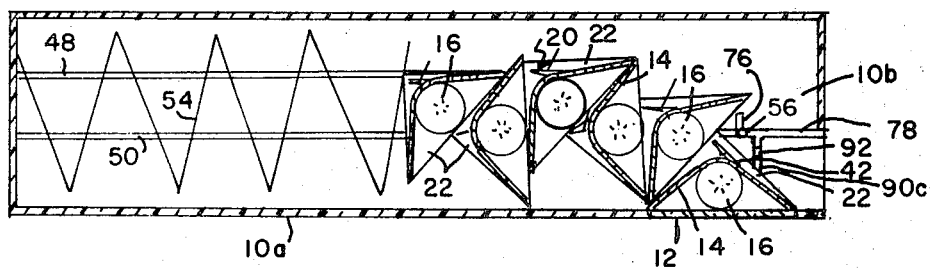
FIG. 2 is a plan view of the upper base portion of the flash magazine of FIG. 1.

As shown in FIG. 2, the container 10, which may comprise an assembly of molded plastic pieces, is provided with a front face 10a, within which the window 12 is disposed, and a base 10b upon which a plurality of lamp units are movably supported. Referring to FIGS. 3-6, each lamp unit comprises a percussively ignitable flashlamp 16 and an associated preenergized striker spring 20 mounted on a movable pallet 22. As will be described in detail hereinafter, the striker springs are individually releasable to fire their respectively associated lamps. Each unit also includes a reflector 14 mounted on the pallet behind the flashlamp; for example, as shown in FIGS. 3-5, the reflector may be shaped to fit snugly upon and be supported solely by the lamp envelope with a clearance being provided at the bottom of the reflector to permit free movement of the striker, upon release, to impact against the lamp.

As shown particularly, in FIG. 3, each lamp 16 comprises an hermetically sealed light-transmitting envelope 24 of tubular shape having a primer depending therefrom. A filling of combustible foil 26, such as zirconium, and a combustion-supporting gas such as oxygen, are disposed in the envelope. The primer comprises a metal tube 28 coaxially depending from the envelope and within which a wire anvil and a charge of fulminating material are disposed. Each lamp is vertically supported on its respectve pallet by means of a bore 30 (FIG. 6) in the pallet into which the primer tube 28 is inserted.

Referring to FIG. 5, each preenergized striker spring 20 comprises a folded torsion device typically formed from 0.021 inch music wire about 2.5 inches long. The wire is shaped to form a hairpin torsional section having segments 32 and 34 joined by a bight 36. The end portion of segment 32 is shaped to define a stationary supporting foot 38, the tip of which is shaped to define a catch 40. Foot 38 is seated in an elongated slot (not shown) formed in the pallet 22, the slot being sufficiently shallow to permit catch 40 to project above the upper surface of the pallet. Accordingly, foot 38 and a portion of catch 40 are shown in dashed lines in FIG. 5. The end portion of segment 34 is shaped to define a striker 42, which when the spring is preenergized, or cocked, as shown, crosses over the supporting foot 38 and is restrained by the catch 40.

Initially, the striker 42 may be formed at an angle of about 90° to the stationary supporting foot 38, although the angle through which the striker is rotated to position it behind catch 40, as shown, may be of any value that does not cause over-stressing of the wire.

Figure 7:
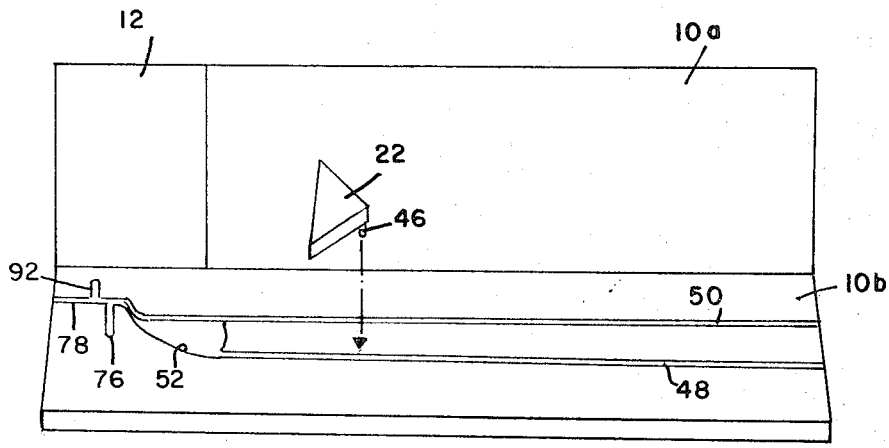
FIG. 7 is a perspective plan view of the channeled base and front wall of the magazine of FIGS. 1 and 2, with the lamp-pallet units and loading spring removed.

Each of the pallets 22 has a substantially triangular shape with a pin 46 depending from one corner. In particular, as shown in the drawings, pin 46 depends from the corner at which the striker 20 is located. To provide a controlled path of travel for the movable pallets, the base 10b is provided with a channel system within which the pallets are slidably retained by means of the pins 46. More specifically, referring to FIGS. 2 and 7, the channel system comprises a pair of parallel tracks 48 and 50 leading to the firing position behind window 12 and a cammed portion 52 at the firing position. As shown in FIG. 2, te triangular pallets 22 retained in the parallel tracks are oriented in an alternating pattern on the base with the pins of every other pallet slidably engaging a first one of the tracks and the pins of the remaining pallets slidably engaging a second one of the tracks whereby the pins of adjacent pallets engage opposite tracks. For example, in FIG. 2, the pins of the first and third pallets from the left side in track 48, while the pins of the second and fourth pallets from the left ride in track 50.

As shown in FIG. 2, the train of pallets are urged from left to right along the parallel tracks toward the firing portion by means of an accordian-shaped loading spring 54 which is mounted on base 10b to push against the left most pallet 22. Accordingly, the cammed channel portion 52 is shaped to orient each pallet moving into the firing position so that the lamp 16 and reflector 14 thereon are in alignment with and face toward window 12. For example, in FIG. 2, the pin of the fifth pallet from the left is riding in the cammed portion 52 of the channel and, thus, is partially rotated toward window 12 as a result of the spring-loaded pressure of the pallet, the triangular pallet shape, and the shape of cam surface 52. The sixth pallet from the left is fully rotated into the firing position.

The spring-loaded train of pallets are locked in position by means of a releasable latch 56 which normally engaged the pallet 22 which is located at the firing position. More specifically, referring to FIGS. 8–10, the latching mechanism comprises a linear bar 58 mounted on a lower portion 60 of the base 10b, for example by brackets 62, so as to be rotatable about its axis. One end of the bar 58 has a projection 56 which functions as the aforementioned pallet latch, while the other end of the bar has a projection 64 disposed near a cammed member 66, which is mounted on base 60 by a rotatable drive shaft 67. As shown, projections 56 and 64 lie in substantially the same plane and are approximately normal to the axis of bar 58. A coiled torsion spring 68 is attached to base 60 and connected about bar 58 to spring-load the bar toward a position with projections 56 and 64 normal to base 60, as shown in FIGS. 8 and 9. It is in this quiescent position that latch 56 engages the pin-corner of the pallet 22 located at the firing position to secure its position.

To enable operative mounting of the magazine 2 on camera 4, the rotatable drive shaft 67 is provided with a depending portion in the form of a mounting post 70 (FIG. 8) which is shaped to be indexably receivable in a rotatable socket (not shown) on the top face of camera 4. Preferably, the socket is coupled to the film advancing mechanism (not shown) in the camera so that it may be rotatably indexed in response to each film advance operation. For example, camera 4 may have a socket and operating mechanism of the type generally available for use with percussive flashcubes, such as that described in U.S. Pat. No. 3,602,618. In this instance, however, contrary to the rotatable flashcube, the magazine container 10 must be held in a fixed position with respect to the camera, while the drive shaft 67 and its depending mounting post 70 are permitted to rotate with the socket. Accordingly, the magazine is also provided with an adjustable post 72 (FIGS. 1 and 8) depending from base 60 and adapted for engaging the edge of the camera when the magazine is mounted thereon.

The rotatable cammed member 66, which forms a part of drive shaft 67, has four equally spaced and symmetrical cam projections 74 adapted to successively engage the projection 64 of the latching bar 58, as the member 68 is rotated. In operation, when the film advancing mechanism in the camera is actuated, the camera socket rotates by a quarter of a turn and thereby causes a like common rotation of post 70, shaft 67 and cammed member 66. Accordingly, at the same time the film is advanced, one of the rotating cam projections 74 momentarily engages and rotates the latching bar projection 64, as illustrated in FIG. 10, and thereby momentarily disengages latch projection 56 from the pallet at the firing position. More specifically, referring to FIG. 10, as the cam 74 begins its quarter turn rotation it rides over projection 64 and forces it toward a parallel position with base 60, whereupon bar 58 rotates latch 56 below a slot 76 in the upper portion of base 10b (FIGS. 2 and 7) to clear the pallet 22 and pin 46 and thereby permit indexing of the train of pallets along the channel system. Then, as cam 74 finishes its quarter turn rotation, it moves away from the latch projection 64 and thereby releases the spring loaded bar 58 whereby latch 56 snaps back into an upright position (FIGS. 8 and 9) to engage the pin corner of the next pallet moving into the firing position. Hence, during film advance, the latch momentarily releases the spring-loaded pallets to provide indexing by one lamp unit.

Figure 11:
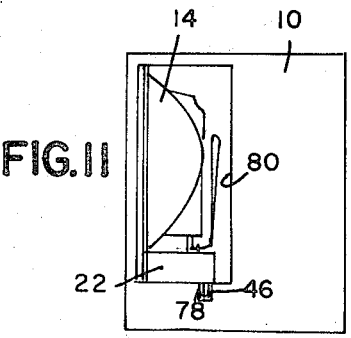
FIG. 11 is a side view of the magazine of FIG. 1.

To provide for ejection of each pallet released by the latch, the end of the channel past the firing position comprises an ejection track 78 (FIGS. 2 and 7) which extends to and is open at an edge of base 10b, and an opening 80 is provided in the side of the closed container 10, as shown in FIG. 11.

Figure 12:
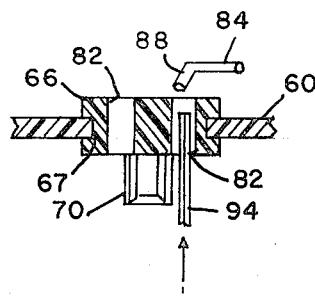
FIG. 12 is a detail cross-section of the rotatable cammed member of the magazine of FIG. 9.

Firing of a flashlamp located at the remote position behind window 12 is accomplished through a mechanical coupling means disposed between the firing position and an access aperture through base portion 60 near mounting post 70. More specifically, referring to FIGS. 9 and 12, the access aperture through which the coupling means is actuated comprises one of four aperture slots 82 provided in the rotatable member 66, 67. In FIGS. 8 and 9, the coupling means is shown as comprising a linear bar 84 mounted on base portion 60, for example, by brackets 86, so as to be rotatable about its axis. One end of the bar has a right-angle projection 88 which lies over at least one of the apertures 82 so as to be accessible therethrough to external actuating means. As illustrated in FIGS. 2, 5 and 9, the cocked firing spring on each pallet 22 is arranged with the striker 42 projecting beyond the periphery of the top surface of the pallet. The other end of bar 84 has a projection 90 which is disposed between base portion 60 and the projecting striker 42 of the flashlamp pallet 22 located at the firing position. To assure reaching the striker 42 when actuated yet clearing pallet 22 and track 78 when in a retracted position, projection 90 is shaped as illustrated in FIGS. 13 and 14. A first segment 90a projects normal to the axis of bar 84 and lies in substantially the same plane as projection 88; a segment 90b projects upwardly and normal to segment 90a; and a segment 90c projects normal to segment 90b and away from bar 84, segment 90c being coplanar with segment 90b and 90a and parallel to segment 90a. A slot 92 in base 10b provides clearance for segments 90b and 90c and access to the overhanging striker 42.

Actuation of coupling bar 84 to flash a lamp at the firing position is effected by a suitable actuating member 94 (FIG. 12) moving up through the aperture 82 positioned under the tip of projection 88 to engage and push against projection 88 and thereby cause bar 84 to rotate about its axis. The concurrent rotation of projection 90 pushes the overlying striker 42 upwardly by a distance sufficient to clear the top of catch 40. The striker then swings clockwise, as viewed from above, and hits and indents the impact sensitive primer tube 28 at a high velocity to cause deflagration of the fulminating material located therein and thus ignite the combustible foil 26. In the typical application of FIG. 1, actuating member 94 may be part of a camera 4 mechanism, such as that described in U.S. Pat. No. 3,602,618 for use with percussive flashcubes, which is designed to enable a photographer to flash a lamp in synchronization with the tripping of the camera shutter to take a picture.

To illustrate overall operation, use of the described flash magazine will now be described with respect to a camera of the type described in U.S. Pat. No. 3,602,618. The photographer loads the camera 4 with a film cartridge and, by operating the film advancing lever (not shown), advances the film to the first frame or exposure. The flashlamp magazine 2 is then mounted on top of the camera. The camera mechanism of U.S. Pat. No. 3.602,618 is designed so that insertions of the mounting post 70 into its complementary receiving socket in the camera causes upward movement of the actuating member 94 to an intermediate position for sensing purposes. In the present application, this sensing movement causes a slight actuation (rotation) of the projection 88 and bar 84 until contact between projection segment 90c and the preenergized striker 42 (at the firing position) restricts further movement, as shown in FIG. 14. The camera is now ready for taking a picture. On the other hand, if a released striker (used lamp) is in the firing position, the upward movement of member 94 is not restricted and actuates an indicator signaling the presence of a used lamp.

When the shutter is actuated to effect an exposure, the camera mechanism synchronously actuates a further movement of member 94 to its maximum upward position. In traveling to this position, member 94 actuates (rotates) the bar 84 and segment 90c sufficiently to cause release of striker 42 to fire its associated lamp at the firing position behind window 12.

To prepare for the next picture, the photographer needs only to operate the film advancing lever (not shown) in the usual manner. This not only advances the film in the film cartridge to the next frame but it also advances the train of pallets 22 in magazine 2 to carry a fresh lamp into firing position in wondow 12 and to eject the used lamp. More specifically, operation of the film advance mechanism causes the camera socket and the attached mounting post 70 to be rotated by a quarter of a turn. During this step, associated cam surfaces in the camera mechanism cause member 94 to be retracted and, thus permit projection 90 to fall back to a quiescent position below pallet 22 and pin 46, as illustrated in FIG. 13. The rotation of mounting post 70 is also transmitted to cammed member 66, whereupon another access aperture 82 is moved into position under the tip of projection 88 and one of the moving cam projections 74 rides over projection 64 and thereby rotates bar 58 and latch 56 to momentarily release the train of spring loaded pallets 22 to permit indexing thereof until the spring loaded latch engages the next pallet. During this indexing step (FIG. 10), the energy of spring 54 forces ejection of the used pallet via track 78 and container opening 80, track 78 being momentarily clear of projections 56 and 90 during this period, and the next pallet sequentially advanced into firing position with its reflector 14 aligned with window 12. At the end of the quarter turn rotation of post 70, the spring-loaded latch 56 will have returned to a position for locking the pallet train, and the camera mechanism will have returned member 94 to the sensing position.

The foregoing operations means normally be repeated several times to take several flash pictures in rapid succession if desired. Preferably, the magazine is capable of storing 12 lamps to be sequentially flashed in response to successive indexing. Accordingly, the magazine is particularly convenient for use with the commonly available 12-exposure film cartridges.

FIGS. 15 and 16 illustrate an alternative embodiment for providing a more compact magazine. Each pallet unit is reduced in size by mounting thereon a smaller reflector segment 96. To provide a larger reflecting surface during flashing, a stationary reflector segment 98 is secured to the inside of the front wall of the container 10 in alignment with window 12. As each pallet 22 is moved into firing position, its associated reflector 96 is aligned with the stationary reflector 98 to provide a two segment reflector for each lamp in the firing position.

It is also contemplated that a camera design may be such that the aperture 82 may be located at the firing position so that each striker 42 thereat may be directly released by the camera actuating member 94, without the need for mechanical coupling means. Also, manual latching means not coupled to the camera mechanism may be employed. The train of pallets may be spring loaded by means other than accordian spring 54. Further, the packaging and transport means described herein may also be applied to a magazine of electrically ignitable lamps. For example, each pallet 22 may carry an electrically ignitable flashlamp having leads connected to a set of contacts mounted on the front or bottom of the pallets, said contacts comprising the means for firing the lamp. In lieu of an access aperture and mechanical coupling means, the electrical magazine base would have a set of contacts at the firing position for mating with the pallet contacts, and conductor strips or wires may interconnected the firing position contacts with suitable contacts for engaging the camera circuit.

Accordingly, although the invention has been described with respect to specific embodiments, it will be appreciated that modifications and changes may be made by those skilled in the art without departing from the true spirit and scope of the invention.

What we claim is:

1. A photoflash assembly comprising, in combination:
   a base member having channel means therein;
   a plurality of pallets slidably retained in said channel means, each pallet having a flashlamp and means for firing the flashlamp mounted thereon,
   spring-loading means linearly urging said pallets along said channel toward a firing position; and,
   a releasable latching means normally engaging one of said pallets at said firing position to thereby lock the position of said plurality of pallets and operable for momentarily releasing said spring-loaded pallets to permit indexing thereof until said latching means engages the next one of said pallets.

2. The assembly of claim 1 wherein one end of said channel means extends to and is open at an edge of said base whereby released pallets are ejected from said base member.

3. The assembly of claim 2 wherein said spring loading means comprises an accordian spring mounted on said base member and disposed to push said plurality of pallets along said channel toward said latching means and the open end of said channel means.

4. The assembly of claim 1 wherein a reflector is mounted on each of said pallets about the flashlamp thereon, each of said pallets has a substantially triangular shape with a pin depending therefrom near a corner thereof, and said channel means comprises a pair of parallel tracks leading to said firing position and a cammed channel portion at said firing position, the triangular pallets retained in said parallel tracks being oriented in an alternating pattern on said base member with the pins of every other pallet slidably engaging a first one of said tracks and the pins of the remaining pallets slidably engaging a second one of said tracks whereby the pins of adjacent pallets engage opposite tracks, and said cammed channel portion is shaped to orient each pallet moving into said firing position so that the lamp and reflector thereon face in a predetermined direction.

5. The assembly of claim 4 wherein said spring-loading means comprises an accordian spring mounted on said base member and disposed to push said plurality of triangular pallets along said parallel tracks toward said firing position.

6. The assembly of claim 1 wherein said latching means comprises: a substantially linear bar mounted on a portion of said base member so as to be rotatable about its axis and having first and second projections, one at each end, approximately normal to the axis thereof, said projections substantially lying in the same plane; means spring-loading said linear bar to urge said bar toward a position with said projections normal to said base, said first projection normally engaging one of said pallets at said firing position to thereby lock the position of said plurality of pallets; and a cammed member mounted on a portion of said base by a rotatable drive shaft having a portion depending from said base which is indexably receivable in rotatable mounting means on a camera, said cammed member having a plurality of equally spaced and symmetrical cam projections adapted to successively engage the second projection of said bar as said cammed member is rotated; and said camera having a film advancing mechanism coupled to said rotatable mounting means which is operative upon actuation to rotate said drive shaft and cammed member whereby one of said cam projections momentarily engages and rotates the second projection of said bar and thereby momentarily disengages said first projection from said pallet at the firing position.

7. The assembly of claim 1 wherein the flashlamp mounted on each pallet is percussively ignitable, and the means for firing the flashlamp mounted on a pallet comprises an associated preenergized striker mounted on the pallet and individually releasable to fire its respective flashlamp.

8. The assembly of claim 7 wherein each of said flashlamps has a primer tube depending therefrom and each of said pallets contains a bore for receiving the primer tube of a respective one of said flashlamps to provide support therefor.

9. The assembly of claim 8 wherein each of said preenergized strikers is a portion of a folded torsion spring comprising a substantially hairpin torsional section having two segments joined by a bight, said striker projecting from one of said segments, a supporting foot projecting from the other of said segments and fixedly mounted on a respective one of said pallets, and a catch formed at the tip of said foot, said striker portion crossing said foot with said catch restraining said striker portion in a cocked condition.

10. The assembly of claim 9 wherein a reflector is mounted on each of said pallets about the flashlamp thereon.

11. The assembly of claim 10 wherein each of said pallets has a substantially triangular shape with a pin depending therefrom near a corner thereof, and said channel means comprises a pair of parallel tracks leading to said firing position and a cammed channel portion at said firing position, the triangular pallets retained in said parallel tracks being oriented in an alternating pattern on said base member with the pins of every other pallet slidably engaging a first one of said tracks and the pins of the remaining pallets slidably engaging a second one of said tracks whereby the pins of adjacent pallets engage opposite tracks, and said command channel portion is shaped to orient each pallet moving into said firing position so that the lamp and reflector thereon face in a predetermined direction.

12. The assembly of claim 11 wherein said spring-loading means comprises an accordian spring mounted on said base member and disposed to push said plurality of triangular pallets along said parallel tracks toward said firing position.

13. The assembly of claim 1 wherein a reflector is mounted on each of said pallets about the flashlamp thereon.

14. The assembly of claim 13 wherein said base comprises one side of a closed container having a window on the front face thereof, said container enclosing said plurality of pallets and associated reflectors and flashlamps, and said firing position being aligned with said window.

15. The assembly of claim 14 wherein an opening is formed on one side of said closed container, and one end of said channel means extends to and is open at an edge of said base in alignment with said opening in the container whereby released pallets are ejected from said closed container.

16. The assembly of claim 14 wherein each of said pallets has a substantially triangular shape with a pin depending therefrom near a corner thereof, and said channel means comprises a pair of parallel tracks leading to said firing position and a cammed channel portion at said firing position, the triangular pallets retained in said parallel tracks being oriented in an alternating pattern on said base member with the pins of every other pallet slidably engaging a first one of said tracks and the pin of the remaining pallets slidably engaging a second one of said tracks whereby the pins of adjacent pallets engage opposite tracks, and said command channel portion is shaped to orient each pallet moving into said firing position so that the lamp and reflector thereon are in alignment with and face toward the window in said closed container.

17. The assembly of claim 16 further including a stationary reflector segment disposed in said container at the front face thereof and aligned with the window therein so that said stationary reflector will in turn be aligned with each pallet reflector as the associated pallet is moved into firing position to thereby provide a two segment reflector for each lamp in firing position.

18. The assembly of claim 14 wherein the flashlamp mounted on each pallet is percussively ignitable, the means for firing the flashlamp mounted on a pallet comprises an associated preenergized striker mounted on the pallet and individually releasable to fire its respective flashlamp, said assembly is receivable on a camera having a mechanical actuating member for firing one of said flashlamps, said base has an aperture therethrough, and further including mechanical coupling means mounted on a portion of said base and disposed between said aperture and said firing position, said coupling means being accessible through said aperture to be actuated by said actuating member and thereupon being operative to release the striker on a pallet disposed at said firing position to fire the flashlamp associated therewith.

19. The assembly of claim 18 wherein said window and the firing position aligned therewith are located such that when said assembly is mounted on a camera having a lens, said window and associated firing position are offset a predetermined distance from said lens for reducing the effect of "red-eye."

20. The assembly of claim 19 wherein the predetermined distance between the center of said lens and the center of a lamp at said firing position is at least about 2½ inches.

21. The assembly of claim 1 wherein the flashlamp mounted on each pallet is percussively ignitable, the means for firing the flashlamp mounted on a pallet comprises an associated preenergized striker mounted on the pallet and individually releasable to fire its respective flashlamp, said assembly is receivable on a camera having a mechanical actuating member for firing one of said flashlamps, said base has an aperture therethrough, and further including mechanical coupling means mounted on a portion of said base and disposed between said aperture and said firing position, said coupling means being accessible through said aperture to be actuated by said actuating member and thereupon being operative to release the striker on a pallet disposed at said firing position to fire the flashlamp associated therewith.

22. The assembly of claim 21 wherein said firing position is located such that when said assembly is mounted on a camera having a lens, the center of a lamp at said firing position is offset from the center of said lens by at least about 2½ inches.

* * * * *